(12) United States Patent
Zhou et al.

(10) Patent No.: US 8,352,731 B2
(45) Date of Patent: Jan. 8, 2013

(54) SECURE DECENTRALIZED STORAGE SYSTEM

(75) Inventors: Ke Zhou, Hubei Province (CN); Dan Feng, Hubei Province (CN); Zhongying Niu, Hubei Province (CN); Tianming Yang, Hubei Province (CN); Qinhua Yan, Hubei Province (CN); Dongliang Lei, Hubei Province (CN); Wei Yan, Hubei Province (CN)

(73) Assignee: Huazhong University of Science & Technology, Hubei Province (CN)

( * ) Notice: Subject to any disclaimer, the term of this patent is extended or adjusted under 35 U.S.C. 154(b) by 915 days.

(21) Appl. No.: 12/425,407

(22) Filed: Apr. 17, 2009

(65) Prior Publication Data

US 2009/0282240 A1 Nov. 12, 2009

(30) Foreign Application Priority Data

May 12, 2008 (CN) .......................... 2008 1 0047679

(51) Int. Cl.
*H04L 29/06* (2006.01)
*G06F 17/30* (2006.01)

(52) U.S. Cl. ........ 713/156; 713/159; 713/161; 713/165; 713/167; 713/172; 713/173; 713/193; 726/1; 726/2; 726/3; 726/5; 726/6; 726/9; 726/26; 726/28; 726/34; 380/277

(58) Field of Classification Search .................. 713/156, 713/167; 726/1
See application file for complete search history.

(56) References Cited

U.S. PATENT DOCUMENTS

| 7,237,027 | B1* | 6/2007 | Raccah et al. ................ 709/226 |
| 7,818,783 | B2* | 10/2010 | Davis ................................. 726/2 |
| 2001/0047485 | A1* | 11/2001 | Brown et al. ................. 713/201 |
| 2003/0046576 | A1* | 3/2003 | High et al. .................... 713/200 |
| 2003/0208681 | A1* | 11/2003 | Muntz et al. .................. 713/179 |
| 2004/0243828 | A1* | 12/2004 | Aguilera et al. .............. 713/200 |
| 2005/0102522 | A1* | 5/2005 | Kanda ........................... 713/176 |
| 2005/0289234 | A1* | 12/2005 | Dai et al. ....................... 709/229 |
| 2006/0174352 | A1* | 8/2006 | Thibadeau ...................... 726/27 |
| 2006/0248585 | A1* | 11/2006 | Ward et al. ...................... 726/20 |
| 2008/0022120 | A1* | 1/2008 | Factor et al. .................. 713/184 |
| 2009/0019157 | A1* | 1/2009 | Suman et al. ................. 709/225 |
| 2009/0182789 | A1* | 7/2009 | Sandorfi et al. .............. 707/204 |
| 2011/0302211 | A1* | 12/2011 | Kilday et al. ................. 707/785 |

* cited by examiner

*Primary Examiner* — Edan Orgad
*Assistant Examiner* — Jenise Jackson

(57) ABSTRACT

A secure decentralized storage system provides scalable security by addressing the performance bottleneck of the security manager and the complexity issue of security administration in large-scale storage systems. The storage system includes: an application client for accessing a file system using a plurality of storage devices and transmitting a command to a storage device; a storage device for storing data and access control entries associated to the data, analyzing the command from the client and performing corresponding operations of the command; a metadata server for storing and managing metadata, such as location and length information of data and system configuration; and a security manager for storing and managing global access control entries and policies of the system and performing the access policy and privilege control according to the global access control entries and policies, such as changing the priority and inheritance rule of access control entries, adding and deleting the access control entries.

2 Claims, 4 Drawing Sheets

| Byte | Bit 7 | 6 | 5 | 4 | 3 | 2 | 1 | 0 |
|---|---|---|---|---|---|---|---|---|
| 0 | (MSB) | | | | | | | |
| 24 | | MEMBER or ROLE ID | | | | | | (LSB) |
| 25 | (MSB) | | | | | | | |
| 29 | | PERMISSION BIT MASK | | | | | | (LSB) |

FIG.3

| Byte | Bit 7 | 6 | 5 | 4 | 3 | 2 | 1 | 0 |
|---|---|---|---|---|---|---|---|---|
| 0 | Reserved | | | | LIST TYPE | | | |
| 1 | Reserved | | | | | | | |
| 2 | (MSB) | | | | | | | |
| 3 | | NUMBER OF ACCESS CONTROL ENTRIES | | | | | | (LSB) |
| 4 | (MSB) | | | | | | | |
| 33 | | FIRST ACCESS CONTROL ENTRY | | | | | | (LSB) |
| 34 | (MSB) | | | | | | | |
| 63 | | SECOND ACCESS CONTROL ENTRY | | | | | | (LSB) |
| | ⋮ | | | | | | | |
| n | (MSB) | | | | | | | |
| n+29 | | LAST ACCESS CONTROL ENTRY | | | | | | (LSB) |

FIG.4

| Byte | Bit | | | | | | | |
|---|---|---|---|---|---|---|---|---|
| | 7 | 6 | 5 | 4 | 3 | 2 | 1 | 0 |
| 0 | OPERATION CODE (7Fh) | | | | | | | |
| 1 | CONTROL | | | | | | | |
| 2–7 | Reserved | | | | | | | |
| 8 | (MSB) | | | SERVICE ACTION (8890h) | | | | |
| 9 | | | | | | | | (LSB) |
| 10 | OPTIONS BYTE | | | | | | | |
| 11 | GET LIST TYPE | | | | SET LIST TYPE | | | |
| 12 | TIMESTAMPS CONTROL | | | | | | | |
| 13–15 | Reserved | | | | | | | |
| 16 | (MSB) | | | PARTITION_ID | | | | |
| 23 | | | | | | | | (LSB) |
| 24 | (MSB) | | | USER_OBJECT_ID | | | | |
| 31 | | | | | | | | (LSB) |
| 32–51 | Reserved | | | | | | | |
| 52 | (MSB) | | | GET ACL LENGTH | | | | |
| 53 | | | | | | | | (LSB) |
| 54 | (MSB) | | | GET ACL OFFSET | | | | |
| 57 | | | | | | | | (LSB) |
| 58 | (MSB) | | | GET ACL ALLOCATION LENGTH | | | | |
| 61 | | | | | | | | (LSB) |
| 62 | (MSB) | | | RETRIEVED ACL OFFSET | | | | |
| 65 | | | | | | | | (LSB) |
| 66 | (MSB) | | | SET ACL LENGTH | | | | |
| 67 | | | | | | | | (LSB) |
| 68 | (MSB) | | | SET ACL OFFSET | | | | |
| 71 | | | | | | | | (LSB) |
| 72–199 | Reserved | | | | | | | |

FIG.5

SECURE DECENTRALIZED STORAGE SYSTEM

BACKGROUND OF THE INVENTION

The disclosed invention generally relates to a secure decentralized storage system, and more particularly, to a secure storage system in which storage devices store access control lists associated with protected objects and authorize users according to their identities and access control lists associated with the objects being accessed without the service of a centralized security manger, thus achieving scalable security in large-scale storage systems by avoiding the performance bottleneck of the security manager.

Large-scale and high-performance storage systems have gained increasing importance in data-intensive applications in areas such as scientific computing, engineering design and simulation, databases, etc. These systems enable the client to directly access data from the storage devices to improve the performance and scalability of the system. However attaching storage devices to a client-network renders the storage devices vulnerable to network attacks such as eavesdropping, masquerading, data modification, and replaying. Securing such a large-sale and high-performance storage system presents new challenges because these systems may service tens or hundreds of thousands of clients and storage devices that in turn typically generate concurrent accesses of both random I/O and high data throughput.

Challenge 1: Added threat environment. The primary purpose of networked storage is to enable low-latency data transfers directly between the client and the storage device to provide high-performance data access. As storage systems and individual storage devices themselves become networked, they must defend against the attacks not only on the stored data itself but also on the messages traversing an untrusted, public network.

Challenge 2: Rapid authorization. Due to the large number of nodes, the big size of the data sets, and the concurrency of their accesses, high performance computing (HPC) and data-intensive applications generate an extremely high aggregate I/O demand on the storage subsystem. File accesses and I/O requests are often both extremely bursty and highly parallel [39] in high-performance storage systems. The efficiency of rapidly authorizing I/O requests directly affects the overall performance of the system.

Challenge 3: Complex security management. The main task of security administration is to maintain user's identity information and access privilege information. Commonly, the identity information is stored in a local user database and the access privilege information is organized in the form of access control list or matrix. There may be tens or hundreds of thousands of clients and storage devices in large-scale storage systems. The user database and access control list or matrix will become so large and complex that they may become more difficult and costly to maintain and operate.

Unfortunately, existing security solutions for large-scale storage systems are ill-prepared for addressing the above challenges because of their inherent limitations. For example, current large-scale storage systems have largely ignored security. The decoupled design of large-scale systems that separates metadata data path from data path to enable direct interaction between clients and devices for improved the performance and scalability of the system has made it difficult for storage devices to obtain implicit knowledge of access privileges and authorizations. In order to access an object, a client has to acquire a capability from the metadata server (MDS) or security manager. In a large-scale storage system with tens or hundreds of thousands of clients, this imposes an unacceptable overhead on the MDS or security server. In HPC systems, it is impractical for servers to generate and return that many capabilities in a timely manner.

There are redundancies and loopholes in current security mechanisms for large-scale storage systems. Existing large-scale storage systems authenticate clients at a centralized authorization server by utilizing an existing security infrastructure, such as Kerberos. The authorization server grants the client access to the devices and then the devices enforce decentralized access controls, thus separating identity management from access control. This separation makes the system vulnerable to security attacks and incurs additional cost of access control.

Most of the current security schemes have ignored the complexity and scalability issue of security administration. Capability-based security mechanisms widely used in most of the current security schemes maintain an access control list (ACL) at a centralized authorization server. Given the tens or hundreds of thousands of clients and storage devices in large-scale storage systems, this ACL can become so large and complex that it may be very challenging to maintain. Identity key schemes, which store the role-based access control list along with each object on the devices, reduce the complexity of security administration to a certain extent in an environment with a large number of clients. Nevertheless, as the number of and amount of data on the devices further increase as is the technological trend, data update (e. g. write operations) will still result in an enormous number of permission operations.

The traditional access control provided by ad-hoc, single-purpose systems has become outdated and is being replaced by the identity-based access control, as the world is gradually becoming identity based. Identity determines what you are and what you can do. An identity-based access control system would not only eliminate a number of passwords and user accounts, but also achieve the centralized management of network security. There is a need for a storage system to merge identity management with access control to improve security, convenience and total cost of access control by eliminating the aforementioned redundancies and loopholes in the decoupled designs of parallel file systems and large-scale storage systems.

BRIEF SUMMARY OF THE INVENTION

Accordingly, the present invention is directed to a secure decentralized storage system, which addresses security challenges in large-scale storage systems due to the big size of data sets and the large number of application clients and storage devices by obviating the performance bottleneck of the security manager and the complexity issue of security administration in these systems.

According to this invention there is provided a secure decentralized storage system comprising: one or more application clients connected to the network; a plurality of storage devices; a security manager and a metadata server, wherein the application clients, the security manager and the metadata server communicate with the storage devices via the iSCSI protocol; wherein the application clients communicate with the security manager and the metadata server via the TCP/IP protocol; wherein said storage devices are object-based storage devices or network-attached storage devices and provide storage service to users with a standard object interface or file interface; and wherein said metadata server manages a plurality of storage devices, balances the load among the storage devices and maps the user's data to multiple storage devices; and said system has the following characters:

said application clients, said storage devices, said security manager, said metadata server and said users are the members of said system; and each member has at least one digital identity certificate;

said storage devices and data stored in the storage devices have their corresponding access control entries;

said security manager stores and manages global access control entries and policies of said system, and performing the access policy and privilege control according to the global access control entries and policies, including changing the priority and inheritance rule of access control entries, adding, modifying and revoking access control entries at said storage devices.

Typically, in accordance with a preferred embodiment of this invention, said digital identity certificate includes the member identifier, role identifier that the member belongs to and expiration time of the certificate; said digital identity certificate is the authority certificate issued by a certificate authority (CA) based on public key infrastructure (PKI) or the identity certificate issued by a trusted authority (TA) based on identity-based encryption (IBE); said access control entries define the member's or role's access privilege to said storage devices and data stored at the storage devices; said access control entries include the member access control entry and role access control entry for the member's and role's access controls respectively; said member access control entry has higher priority than said role access control entry; the members that has access privileges grant, revoke and update the access privileges by adding, deleting and modifying access control entries.

Typically, in accordance with a preferred embodiment of this invention, said access control entries are organized in the form of access control lists, including member access control lists and role access control lists; said data stored in said storage devices inherits the access control entries of said storage devices; the identity certificates of said application clients are implemented using intelligent cards.

Typically, in accordance with a preferred embodiment of this invention, said metadata server and said security manager reside in a computer.

The access to the system according to the present invention includes the following steps:

1) The security manager or users in the application client sign the request, and then send the request and signature to the storage device;

2) After receiving the request, the storage device validates the digital identity certificate, which is sent to the storage device by the member of the system, or stored by the storage device in advance or derived from the member's identity, and confirms the member's identity by verifying the member's signature on the request. And then, the storage device authorizes the member according to her identity, the role that the member belongs to and access control entries associated with the storage device and the stored data.

3) A member having access privileges can grant, revoke and update their own access privileges by adding, deleting and modifying access control entries. If receiving a grant request, the storage device adds the corresponding access control entries in access control lists of the storage device or the stored data; if receiving a revoke request, the storage device deletes the corresponding access control entries in access control lists of the storage device or the stored data; and if receiving an update request, the storage device replaces original permissions in access control entries of the storage device or the stored data with new permissions received.

The present invention decentralizes members' access privileges to storage devices and associates them with the storage devices or the stored data. When a storage device receives a member's request, it only needs to validate the member's identity and authorizes the member according to the member's identity, the role that the member belongs to and access control entries associated with the storage device and the stored data. Since any member has to prove her identity by a certificate (such as a smart card or passport), which is secured against physical or electronic forgery attempts and storage devices, that is, data providers themselves determine the member's identity and specify what the member is allowed to do by the locally stored privilege information, the security of the system according to the present invention has been significantly improved over that of capability-based storage systems that use capabilities to deliver privilege information. Before access to storage devices the member don't need to request capabilities from the security manager, thus the system according to the present invention completely eliminating the performance bottleneck of the security manager caused by security overhead. It is significant for large-scale and high-performance storage systems to associate access control lists with protected objects because performance is becoming more important than ever in these systems. Once an object is located the corresponding access control lists will be located, thus access control and permission management will become more direct and efficient. Moreover, allowing privileges to be inherited means that an object can automatically obtain the corresponding permissions granted to its parent without having to manually assign these permissions to it. This rule ensures that operations of object creation can be performed quickly in a high-performance system, which can generate a large number of objects in a timely manner and each object must be assigned the corresponding permissions.

BRIEF DESCRIPTION OF THE DRAWINGS

The accompanying drawings, which are included to provide a further understanding of the invention, are incorporation in and constitute a part of this application, illustrate embodiments of the invention and together with the description serve to explain the principle of the invention. In the drawings:

FIG. 3 is a table showing the format of a member's or role's access control entry according to an embodiment of the present invention;

FIG. 4 is a table showing the format of a member's or role's access control list according to an embodiment of the present invention; and FIG. 5 is a table showing the format of the set access control entry command according to an embodiment of the present invention.

DETAILED DESCRIPTION OF THE INVENTION

An embodiment of a system using an object-based storage device according to the present invention will now be described in detail, examples of which are illustrated in the accompanying drawings. The American National Standard Institute authorizes the first version of the OSD (Object-based Storage Device) standard in January 2005, namely, SCSI Object-Based Storage Device Commands which is submitted by T10, a Technical Committee of Accredited Standards Committee INCITS (InterNational Committee for Information Technology Standards). The T10 OSD standard defines a capability-based access control model. We extend the T10 OSD standard to support this embodiment. It should be noted that this invention is also available for heterogeneous storage devices, such as object-based storage devices, network-attached storage devices, as well as one or more types of storage devices.

Figure 1:
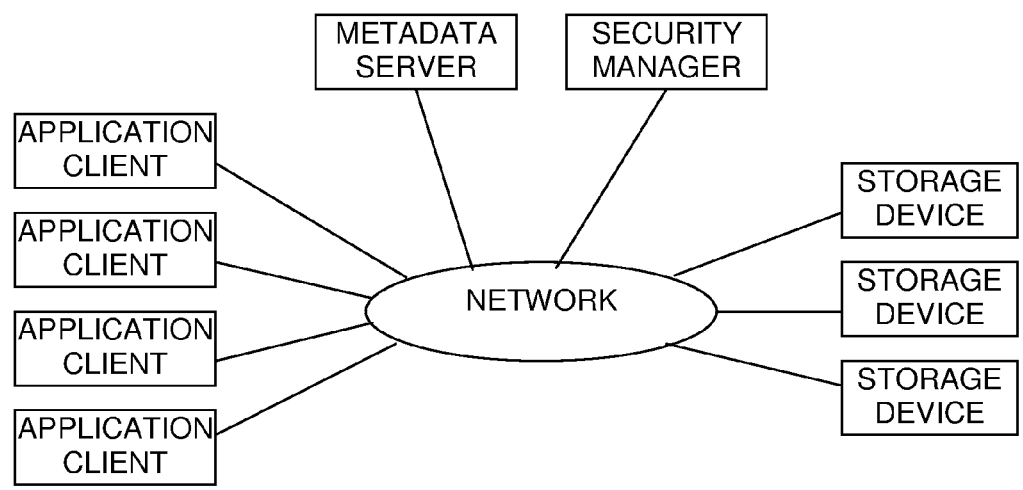
FIG. 1 is a block diagram illustrating a secure, network-based decentralized storage system according to an embodiment of the present invention.

FIG. 1 is a block diagram illustrating a secure, network-based decentralized storage system including a plurality of application clients connected through a network, a metadata server, a security manager and a plurality of storage devices according to an embodiment of the present invention.

Figure 2:
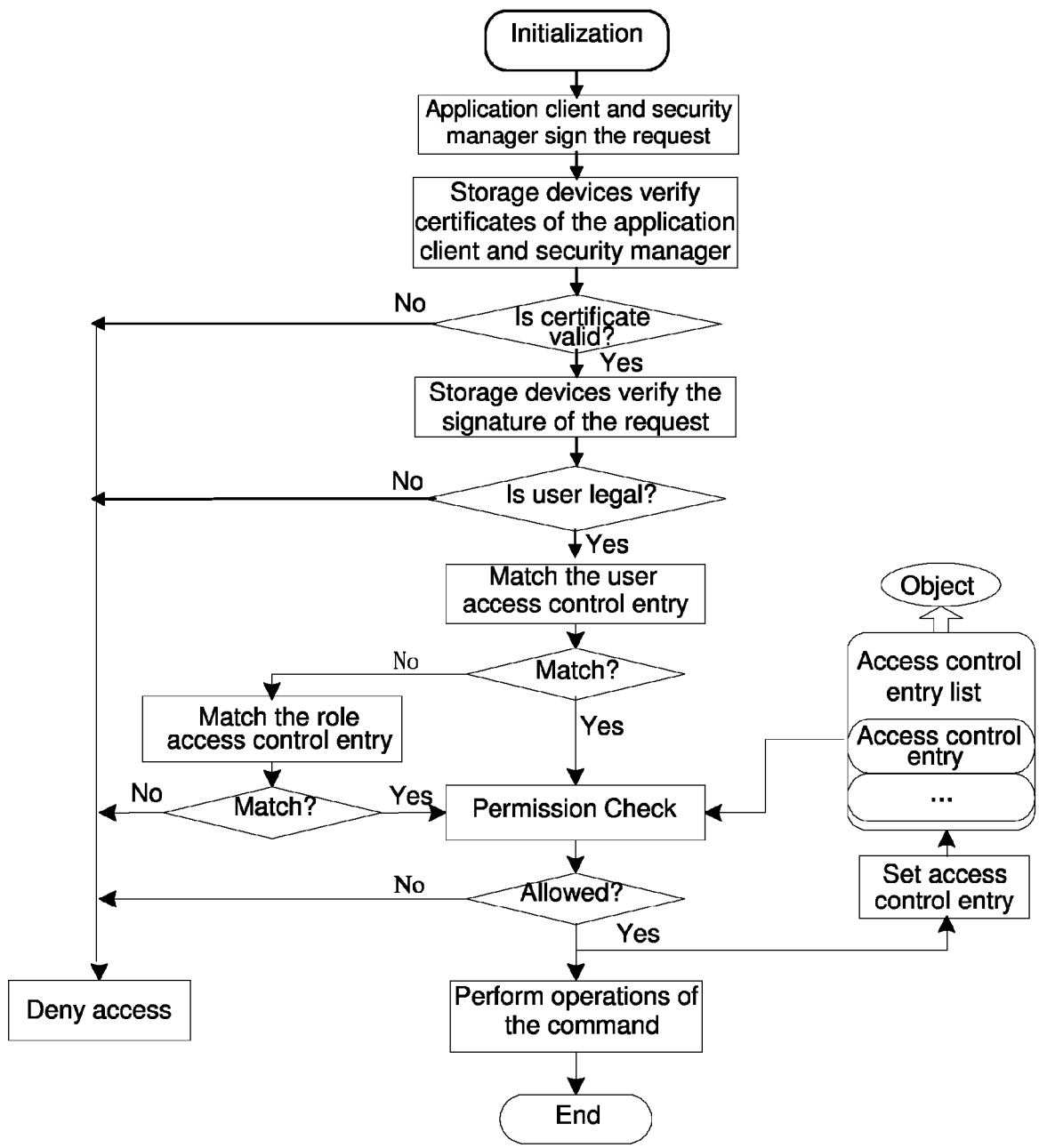
FIG. 2 is a flowchart depicting a request processing procedure according to an embodiment of the present invention.

FIG. 2 is a flowchart depicting a request processing procedure according to an embodiment of the present invention, including the following steps:

1) The user in the application client or the security manager signs the access request and then sends the access request and the signature to the storage device.

2) The storage device validates the member's identity by:
A) validating the member's digital identity certificate, and
B) validating the member's signature.

3) The storage device validate the member's privileges by:
A) searching the member access control list associated with the requested storage device or the stored data. If the member identifier of one of member access control entries in the member access control list matches the current member identifier, the storage device authorizes the member according to the corresponding member access control entry, otherwise
B) searching the role access control list associated with the requested storage device or the stored data. If the role identifier of one of role access control entries in the role access control list matches the current role identifier, the storage device authorizes the member according to the corresponding role access control entry; otherwise
C) Denying the member's request.

4) Set access control entries:
A member having access privileges can grant, revoke and update their own access privileges by adding, deleting and modifying access control entries using the set access control entry command.

FIG. 3 is a table showing the format of an access control entry according to an embodiment of the present invention. Access control entries include member access control entries and role access control entries, which define the member's and role's access privileges to the storage device and data stored at the storage device respectively.

An access control entry is 30 bytes long with 8 bits per byte.

The MEMBER or ROLE ID field is 25 bytes long, specifying the member identifier or role identifier respectively. The member identifier can be an integer or a member's name, such as the serial number of an application client or storage device, or the name of a security manager or metadata server. The role identifier can be a role's name, such as role A, role B . . . , or administrator and common user.

The PERMISSION BIT MASK field is 5 bytes long, specifying access privileges that the member or role in the access control entry can perform on the request storage device or stored data, such as read, write, delete and create.

FIG. 4 is a table showing the format of a member's or role's access control list according to an embodiment of the present invention, including the LIST TYPE field, the NUMBER OF ACCESS CONTROL ENTRIES field and the ACCESS CONTROL ENTRY field.

The LIST TYPE field occupies the lowest 4 bits of the first byte, specifying the type of the access control list. A LIST TYPE field set to 1h indicates the member access control list and a LIST TYPE field set to 2h indicates the role access control list, wherein 'xh' represents a hexadecimal number.

The NUMBER OF ACCESS CONTROL ENTRIES field is 2 bytes long, specifying the number of access control entries in the access control list.

The ACCESS CONTROL ENTRY field includes optional number of access control entries, each of size 30 bytes. Each access control entry is either the member access control entry or the role access control entry shown in FIG. 3. If the LIST TYPE field contains 1h, the access control entry field stores the member access control entry; if the LIST TYPE field contains 2h, the access control entry field stores the role access control entry.

FIG. 5 is a table showing the format of the set access control entry command according to an embodiment of the present invention. This command is used to set and retrieve the specified access control entries for a member having administration privileges or the security manger, and supports the following operations, such as get, add, delete and modify an access control entry. This command is compatible with the T10 OSD command, occupying a total of 200 bytes in which the first 10 bytes have the same contents as the T10 OSD command. Wherein the first byte is the OPERATION CODE field containing 7Fh, and the second byte is the CONTROL byte. The SERVICE ACTION field occupies the 8th and 9th byte, and the value of 8890h is designed for the set access control entry command according to the embodiment of the present invention. The service action specific field shown in FIG. 5 begins from the 10th byte. The definition of all fields in the service action specific field is listed as follows.

1) The contents of the OPTIONS BYTE are defined in the T10 OSD command.

2) The GET LIST TYPE field occupies the highest 4 bits of the 11th byte, which specifies the type of the ACL needing to be retrieved. A LIST TYPE field set to 1h indicates a member access control list needing to be retrieved and a LIST TYPE field set to 2h indicates a role access control list needing to be retrieved.

3) The SET LIST TYPE field occupies the lowest 4 bits of the 11th byte, which specifies the type of the ACL need to be set. A LIST TYPE field set to 1h indicates a member access control list needing to be set and a LIST TYPE field set to 2h indicates a role access control list needing to be set.

4) The TIMESTAMPS CONTROL field occupies the 12th byte, the contents of which are defined in T10 OSD command.

The 13th to 15th bytes are reserved.

5) The PARTITION_ID field and USER_OBJECT_ID field occupy the 16th to 23rd bytes and the 24th to 31st bytes respectively. Their contents are defined in T10 OSD command. The PARTITION_ID field and USER_OBJECT_ID field specify the object that is associated with the request access control entry.

The 32nd to 51st bytes are reserved.

6) The GET ACL LENGTH field occupies the 52nd to 53rd bytes, which specifies the length of an access control list that specifies one or more access control entries to be retrieved. A get access control list length zero specifies that no get access control list is included with the command. A get access control list length of FFFFh specifies that all access control entries associated with the requested OSD object shall be retrieved.

7) The GET ACL OFFSET field occupies the 54th to 57th bytes, which specifies the byte offset of the first Data-Out Buffer byte containing the get access control list.

8) The GET ACL ALLOCATION LENGTH field occupies the 58th to 61st bytes, which specifies the number of bytes allocated to receive the retrieved access control list.

9) The RETRIEVED ACL OFFSET field occupies the 62nd to 65th bytes, which specifies the byte offset of the first Data-In Buffer byte containing the retrieved access control list.

10) The SET ACL LENGTH field occupies the 66th to 67th bytes, which specifies the length of an access control list that specifies one or more access control entries to be set. A set access control list length of zero specifies that no set access control list is included with the command. A set access control list length of FFFFh specifies that all access control entries associated with the requested OSD object shall be set.

11) The SET ACL OFFSET field occupies the 68th to 71st bytes, which specifies the byte offset of the first Data-Out Buffer byte containing the first byte of the set access control list.

The 72nd to 199th bytes are reserved.

What is claimed is:

1. A secure decentralized storage system, said system comprising:

one or more application clients connected to the network; a plurality of storage devices; a security manager and a metadata server, wherein the application clients, the security manager and the metadata server communicate with the storage devices via the iSCSI protocol; wherein the application clients communicate with the security manager and the metadata server via the TCP/IP protocol; wherein said storage devices are object-based storage devices or network-attached storage devices and provide storage service to users with a standard object interface or file interface; and wherein said metadata server manages a plurality of storage devices, balances the load among the storage devices and maps the user's data to multiple storage devices; and said system has the following characters:

said application clients, said storage devices, said security manager, said metadata server and said users are the members of said system; and each member has at least one digital identity certificate;

said storage devices and data stored in the storage devices have their corresponding access control entries;

said security manager stores and manages global access control entries and policies of said system, and performing the access policy and privilege control according to the global access control entries and policies, including changing the priority and inheritance rule of access control entries, adding, modifying and revoking access control entries at said storage devices;

wherein said digital identity certificate includes the member identifier, role identifier that the member belongs to and expiration time of the certificate; said digital identity certificate is the authority certificate issued by a certificate authority (CA) based on public key infrastructure (PKI) or the identity certificate issued by a trusted authority (TA) based on identity-based encryption (IBE); wherein said access control entries define the member's or role's access privilege to said storage devices and data stored at the storage devices; said access control entries include the member access control entry and role access control entry for the member's and role's access controls respectively; said member access control entry has higher priority than said role access control entry; the members having access privileges grant, revoke and update the access privileges by adding, deleting and modifying access control entries.

2. The secure decentralized storage system of claim 1, wherein said access control entries are organized in the form of access control lists, including member access control lists and role access control lists; wherein said data stored in said storage devices inherits the access control entries of said storage devices; wherein the identity certificates of said application clients are implemented using intelligent cards.

* * * * *